(12) United States Patent
Ische et al.

(10) Patent No.: US 12,198,475 B1
(45) Date of Patent: Jan. 14, 2025

(54) ORCHESTRATED INTELLIGENT EDGE SENSING

(71) Applicant: Lytx, Inc., San Diego, CA (US)

(72) Inventors: Marc Ische, San Diego, CA (US);
Jeremiah Todd Wittevrongel, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 17/018,879

(22) Filed: Sep. 11, 2020

(51) Int. Cl.
| | |
|---|---|
| G06V 20/56 | (2022.01) |
| G06V 20/40 | (2022.01) |
| G07C 5/00 | (2006.01) |
| G07C 5/08 | (2006.01) |
| H04L 67/125 | (2022.01) |
| H04L 67/62 | (2022.01) |

(52) U.S. Cl.
CPC .......... G07C 5/008 (2013.01); G06V 20/44 (2022.01); G06V 20/56 (2022.01); G07C 5/085 (2013.01); H04L 67/125 (2013.01); H04L 67/62 (2022.05)

(58) Field of Classification Search
CPC ....... G07C 5/008; G07C 5/085; H04L 67/125; H04L 67/62; G06V 20/44
See application file for complete search history.

(56) References Cited

U.S. PATENT DOCUMENTS

| | | | | |
|---|---|---|---|---|
| 6,754,485 | B1 * | 6/2004 | Obradovich | H04L 67/12 340/7.52 |
| 8,688,306 | B1 * | 4/2014 | Nemec | B60W 50/14 455/457 |
| 9,047,721 | B1 * | 6/2015 | Botnen | G07C 5/008 |
| 9,158,962 | B1 * | 10/2015 | Nemat-Nasser | G06T 1/0007 |
| 9,298,575 | B2 * | 3/2016 | Tamari | G06F 11/3058 |
| 9,373,257 | B2 * | 6/2016 | Bonhomme | G08G 1/096775 |
| 9,805,601 | B1 * | 10/2017 | Fields | G06V 20/58 |
| 10,109,185 | B1 * | 10/2018 | Dubois, Jr. | G08G 1/0133 |
| 10,909,859 | B1 | 2/2021 | Dodd | |
| 10,997,423 | B1 | 5/2021 | Borras | |
| 11,518,510 | B1 | 12/2022 | Gohl | |
| 11,604,069 | B2 | 3/2023 | Elvanoglu | |
| 2003/0210806 | A1 | 11/2003 | Yoichi | |
| 2010/0114423 | A1 * | 5/2010 | Boss | G08G 1/205 340/994 |
| 2013/0096731 | A1 * | 4/2013 | Tamari | G06F 11/3058 701/1 |

(Continued)

*Primary Examiner* — Logan M Kraft
*Assistant Examiner* — Joshua Campbell
(74) *Attorney, Agent, or Firm* — Van Pelt, Yi & James LLP

(57) ABSTRACT

A system for dynamic capturing of dynamic event data includes an interface and a processor. The interface is configured to receive a request for dynamic event data at a vehicle event recorder. The processor is configured to extract a location and a configuration setting from the request, modify a setting associated with collection of the dynamic event data according to the configuration setting, wherein the dynamic event data is collected using one or more sensors, determine whether the vehicle event recorder is located appropriately to record the dynamic event data using the one or more sensors, in response to determining that the vehicle event recorder is located appropriately to record the dynamic event data using the one or more sensors, record the dynamic event data from the one or more sensors, and provide the dynamic event data.

20 Claims, 16 Drawing Sheets

(56) References Cited

U.S. PATENT DOCUMENTS

| | | | |
|---|---|---|---|
| 2016/0050356 A1* | 2/2016 | Nalepka | H04N 7/181 |
| | | | 348/148 |
| 2016/0253618 A1 | 9/2016 | Imazawa | |
| 2017/0066374 A1* | 3/2017 | Hoye | B60Q 9/00 |
| 2017/0257602 A1 | 9/2017 | Axson | |
| 2018/0068567 A1 | 3/2018 | Gong | |
| 2018/0322775 A1* | 11/2018 | Chase | G06F 15/76 |
| 2018/0341706 A1 | 11/2018 | Agrawal | |
| 2019/0042900 A1 | 2/2019 | Smith | |
| 2020/0027333 A1 | 1/2020 | Xu | |
| 2020/0073969 A1 | 3/2020 | Kursar | |
| 2020/0082188 A1 | 3/2020 | Singh | |
| 2021/0035442 A1 | 2/2021 | Baig | |
| 2021/0122292 A1 | 4/2021 | Javeri | |

* cited by examiner

ORCHESTRATED INTELLIGENT EDGE SENSING

BACKGROUND OF THE INVENTION

Low frequency monitoring of public space is frequently necessary for legal or compliance purposes and can be disproportionately expensive. For example, an advertising company might guarantee to its customers that all billboards will be checked once a week to verify that the advertising on the billboard is still in good condition. Available options for verifying the billboard condition (e.g., hiring an employee to drive to view each billboard, dedicating a cellular-enabled camera to capture and upload images, etc.) are expensive compared to the benefit to the company of checking and the rare occasion that something is found. Other tasks of low frequency monitoring of public spaces are similar—a town checking that its road signs have not been obscured by trees, checking whether a lane is still blocked by construction, verifying traffic lights and walk/don't walk signs are functioning, etc.—all produce valuable information but can be prohibitively expensive to manually investigate. This creates a problem where investigations are not performed and problems that do exist are not identified.

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of or happenings during an anomalous event (e.g., a sudden stop, a hard maneuver, a collision, etc.). A vehicle comprising a vehicle event recorder and a set of sensors will likely drive past a target of interest (e.g., a billboard) on a regular basis, however, it can be very difficult to guarantee a given vehicle will perform all necessary data collection for any given task.

BRIEF DESCRIPTION OF THE DRAWINGS

Various embodiments of the invention are disclosed in the following detailed description and the accompanying drawings.

DETAILED DESCRIPTION

Figure 1:
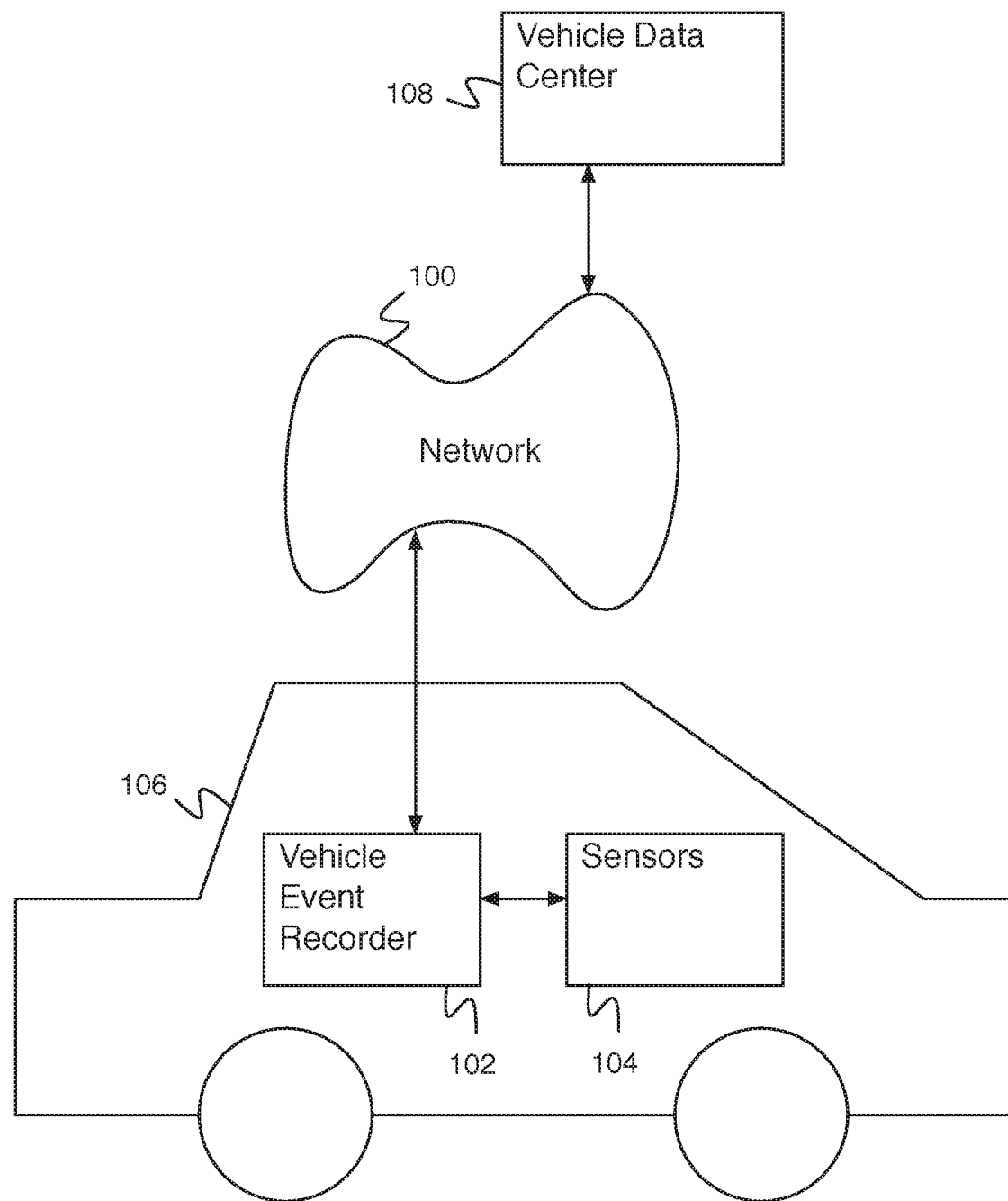
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for capturing location-based data is disclosed. The system comprises an interface and a processor. The interface is configured to receive a location-based data description for capturing the location-based data. The processor is configured to determine a location based at least in part on the location-based data description, create a location-based data identification job based at least in part on the location, cause execution of the location-based data identification job to a set of vehicle event recorder systems, wherein the location-based data identification job is executed by a vehicle event recorder system of the set of vehicle event recorder systems to acquire sensor data in response to a vehicle being able to acquire the sensor data related to the location of the location-based data identification job, receive the sensor data from the vehicle event recorder system, and determine the location-based data based at least in part on the sensor data.

A system for dynamic capturing of dynamic event data is disclosed. The system comprises an interface and a processor. The interface is configured to receive a request for dynamic event data at a vehicle event recorder. The processor is configured to extract a location and a configuration setting from the request, modify a setting associated with collection of the dynamic event data according to the configuration setting, wherein the dynamic event data is collected using one or more sensors, determine whether the vehicle event recorder is located appropriately to record the dynamic event data using the one or more sensors, in response to determining that the vehicle event recorder is located appropriately to record the dynamic event data using the one or more sensors, record the dynamic event data from the one or more sensors, and provide the dynamic event data.

A system for capturing location-based data comprises a system for utilizing a fleet of vehicles, wherein each vehicle includes a vehicle event recorder coupled to a set of sensors, for capturing data from a distributed set of locations (e.g., identifying objects at specific locations and at specific times, identifying specific objects at any location or within an area or within a time period, etc.). The vehicle event recorder comprises a system for collecting and processing sensor data during a vehicle trip, for analyzing anomalous events, driver behaviors, road conditions, behaviors of other vehicles on the road, etc. For example, a vehicle event recorder system is used to create a record of an accident in order to reduce liability costs. The system for capturing location-based data comprises a server system in communication with the plurality of vehicle event recorders via a network.

In some embodiments, the system receives a location-based data description for capturing the location-based data, and determines a location-based data identification job using the location-based data description. For example, the location-based data identification job comprises one or more locations for data capture of a target object. The location-based data identification job comprises other information when appropriate, for example, a travel direction for image capture, an angle from the road, model data (e.g., neural network model, machine learning model, etc.) for image recognition, a time range for image capture (e.g., the image should be captured between 3 PM and 5 PM), a distance range for image capture (e.g., the image should be captured by a camera that is between 10 feet and 50 feet away from the target of interest), an image capture frequency (e.g., an image of the target object should be captured once a month), etc.

In some embodiments, the system determines a set of vehicle event recorders for execution of the job. Determination of the set of vehicle event recorders is based at least in part on factors including vehicle event recorder job load, vehicle event recorder route, vehicle event recorder system processing capacity, vehicle event recorder associated sensors, etc. The system provides the job to the set of vehicle event recorders, and the vehicle event recorders automatically execute the job during normal vehicle operation. In the event it is determined that the vehicle event recorder is able to acquire the desired sensor data (e.g., that the vehicle is near the target, that the vehicle is oriented towards the target, etc.), the job is executed, and the data captured. The system then receives and processes the sensor data to determine the location-based data. The system tracks data receipt and makes a determination regarding whether the job is complete and should be stopped (e.g., in the event of a job for capturing data once or a fixed number of times) or paused (e.g., in the event of a job for capturing data at a predetermined frequency—for example, once per week, once per month, etc.). In the event the system determines that the job should be stopped or paused, an indication is provided to the vehicle event recorder systems.

In some embodiments, the system for capturing location-based data improves the computer by transforming a set of independent vehicle event recorders on vehicles into a sensor network system capable of accomplishing monitoring tasks that would otherwise not be possible or would be disproportionately expensive. Monitoring can be accomplished as a background process on the vehicle event recorder and without requiring the vehicle driver to modify the route or perform any special tasks.

In some embodiments, a system for dynamic capturing of dynamic event data comprises a vehicle event recorder system for dynamic capturing of dynamic event data. The vehicle event recorder system receives a request for dynamic event data (e.g., from a vehicle data center), wherein the request for dynamic event data comprises a location and/or a configuration setting. The request for dynamic event data comprises a request to capture a dynamic event—for example, an event already underway, an event with a limited duration, etc. The location comprises the dynamic event location. The configuration setting comprises a configuration setting for dynamically modifying a sensor configuration (e.g., in order to better capture the dynamic event). When the system for dynamic capturing of dynamic event data receives the request, it modifies a setting associated with collection of the dynamic event data according to the configuration setting. For example, system for dynamic capturing of dynamic event data modifies a video frame rate setting, a video resolution setting, an accelerometer sample rate setting, an accelerometer power level, a global positioning system (GPS) sample rate setting, an audio sensor sample rate, etc. The system then monitors its location and orientation, and in response to determining that it is located appropriately to record the dynamic event data, the data is recorded.

In various embodiments, a dynamic event comprises an accident that has recently occurred and is blocking traffic, an animal loose on city streets, a crime in progress, or any other appropriate event. In the event a first vehicle event recorder on a first vehicle captures data indicating a dynamic event and provides the data to the vehicle data center, the vehicle data center creates a request for dynamic event data and provides the request for dynamic event data to a set of vehicle event recorders on vehicles in the vicinity of the dynamic event. As a result of the fast-moving nature of the dynamic event, a higher than typical sensor resolution is likely to be necessary to capture the event data. Sensor configuration settings are determined by the vehicle data center (e.g., based at least in part on the event type, the event location, etc.) and are provided as part of the request for dynamic event data. In response to a receipt of dynamic event data from a vehicle event recorder, the vehicle data center is able to make a determination that the dynamic event data is satisfactory, or that the dynamic event data is not satisfactory and needs to be captured again. In the event the vehicle data center determines that the dynamic event data is satisfactory, the vehicle data center provides an indication to stop collecting dynamic event data. In the event that the vehicle data center determines that the dynamic event data is not satisfactory, the vehicle data center is able to immediately create a new request for dynamic event data and provide the new request for dynamic event data to one or more vehicle event recorders. The new request for dynamic event data can include a new location, a new configuration setting or settings, and/or be provided to a new set of vehicle event recorders.

In some embodiments, the system for dynamic capturing of dynamic event data improves the computer by allowing quickly changing dynamic events to be captured based on a dynamic request to fleet vehicles on their normal routes through a city. A remote request can be used to modify configuration settings in order to acquire high-resolution imagery using a sensor device typically used in a low-resolution mode.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system (ADAS) sensors, a GPS, outdoor temperature sensors, moisture sensors, line tracker sensors (e.g., laser line tracker sensors), a lane change sensor, etc. Vehicle state sensors comprise internal vehicle state sensors—for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. For example, vehicle event recorder 102 comprises a system for dynamic capturing of dynamic event data, comprising an interface configured to receive a request for dynamic event data at a vehicle event recorder and a processor configured to extract a location and a configuration setting from the request, modify a setting associated with collection of the dynamic event data according to the configuration setting, wherein the dynamic event data is collected using one or more sensors, determine whether the vehicle event recorder is located appropriately to record the dynamic event data using the one or more sensors, in response to determining that the vehicle event recorder is located appropriately to record the dynamic event data using the one or more sensors, record the dynamic event data, and provide the dynamic event data.

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night).

Vehicle event recorder 102 communicates with vehicle data center 108 via network 100. Vehicle data center 108 comprises a remote server for data storage, data analysis, data access by a coach and/or manager, data review by a human reviewer, etc.

In some embodiments, vehicle data center 108 comprises a system for capturing location-based data, comprising an interface configured to receive a location-based data description for capturing the location-based data and a processor configured to determine a location based at least in part on the location-based data description, create a location-based data identification job based at least in part on the location and the configuration setting, cause execution of the location-based data identification job to a set of vehicle event recorder systems, wherein the location-based data identification job is executed by a vehicle event recorder system of the set of vehicle event recorder systems to acquire sensor data in response to a vehicle being able to acquire the sensor data related to the location of the location-based data identification job, receive the sensor data from the vehicle event recorder system, and determine the location-based data based at least in part on the sensor data.

In some embodiments, vehicle event recorder 102 comprises a system for dynamic capturing of dynamic event data. Vehicle event recorder 102 comprises an interface and a processor. The interface is configured to receive a request for dynamic event data at a vehicle event recorder. The processor is configured to extract a location and a configuration setting from the request, modify a setting associated with collection of the dynamic event data according to the configuration setting, wherein the dynamic event data is collected using one or more sensors, determine whether the vehicle event recorder is located appropriately to record the dynamic event data using the one or more sensors, in response to determining that the vehicle event recorder is located appropriately to record the dynamic event data using the one or more sensors, record the dynamic event data, and provide the dynamic event data.

Figure 2:
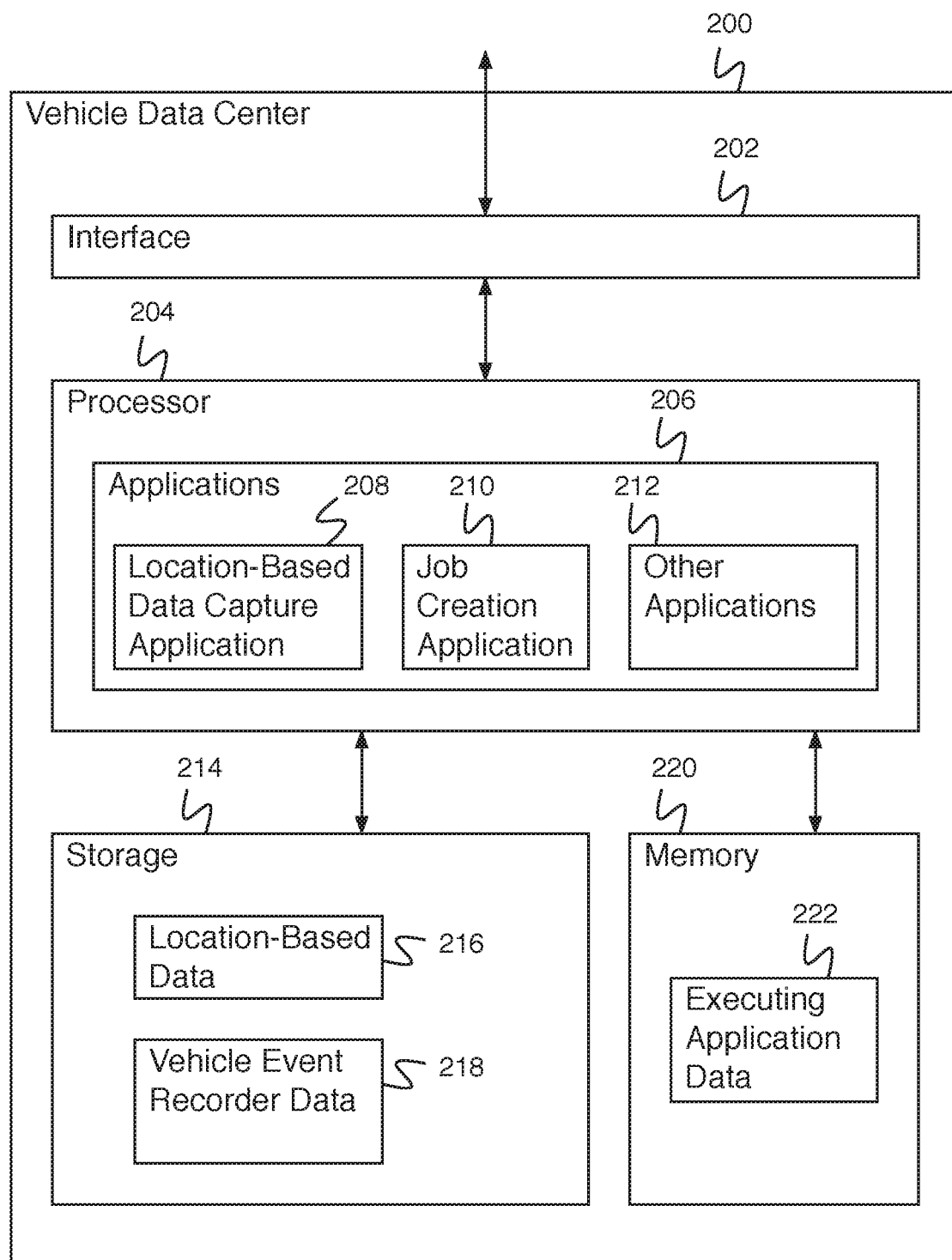
FIG. 2 is a block diagram illustrating an embodiment of a vehicle data center.

FIG. 2 is a block diagram illustrating an embodiment of a vehicle data center. In some embodiments, vehicle data center 200 comprises vehicle data center 108 of FIG. 1. In various embodiments, vehicle data center 200 comprises a computer, a networked set of computers, a cloud computing system, or any other appropriate vehicle data center system. In the example shown, vehicle data center 200 comprises interface 202. For example, interface 202 comprises an interface for receiving a data system, receiving sensor data, receiving a location-based data description, receiving network communications, providing an indication of an anomalous event, providing a job to a vehicle event recorder, providing sensor data, providing communications, providing coaching information, etc. Processor 204 comprises a processor for executing applications 206. Applications 206 comprise location-based data capture application 208, job creation application 210, and other applications 212. Location-based data capture application 208 comprises an application for coordinating a location-based data capture process for capturing location-based data. For example, locating application 208 comprises an application for determining a location based at least in part on a location-based data description, creating a location-based data identification job (e.g., using job creation application 210) based at least in part on the location and the configuration setting, causing execution of the location-based data identification job to a set of vehicle event recorder systems, wherein the location-based data identification job is executed by a vehicle event recorder system of the set of vehicle event recorder systems to acquire sensor data in response to a vehicle being able to acquire the sensor data related to the location of the location-based data identification job, receiving the sensor data from the vehicle event recorder system, and determining the location-based data based at least in part on the sensor data. Job creation application 210 comprises an application for building a location-based data capture job. For example, job creation application 210 comprises an application for determining data capture instructions based at least in part on a set of locations. Other applications 212 comprise any other appropriate applications (e.g., a communications application, a data storage and retrieval application, a web browser application, a user interface application, a data analysis application, etc.). Storage 214 comprises location-based data 216 (e.g., processed sensor data indicating located items and/or metadata associated with the sensor data—for example, time, date, location, vehicle event recorder identifier, etc.) and vehicle event recorder data 218 (e.g., vehicle event recorder hardware capabilities, scheduled jobs, planned routes, etc.). Memory 220 comprises executing application data 222 comprising data associated with applications 206.

Figure 3:
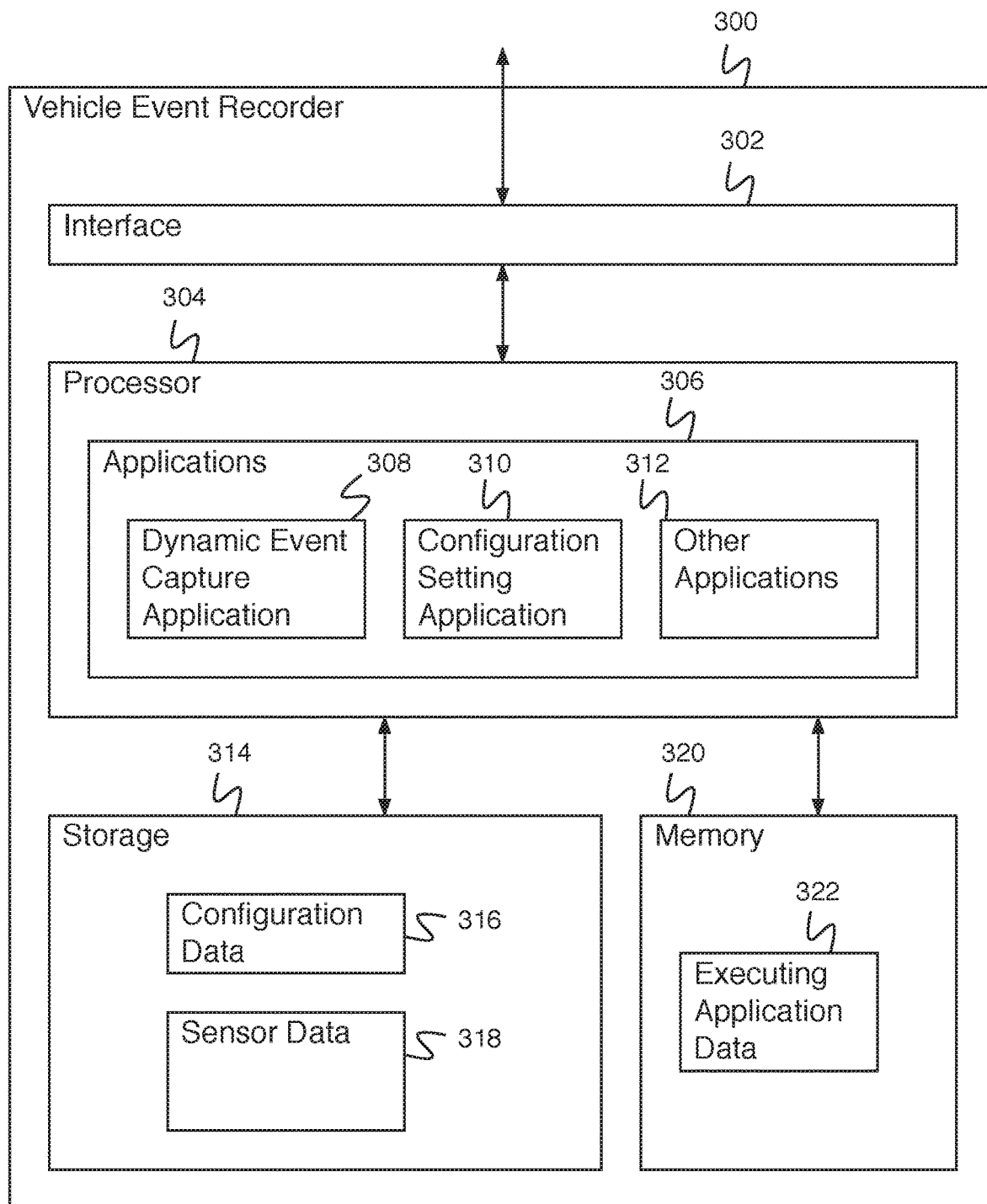
FIG. 3 is a block diagram illustrating an embodiment of a vehicle event recorder.

FIG. 3 is a block diagram illustrating an embodiment of a vehicle event recorder. In some embodiments, vehicle event recorder 300 comprises vehicle data center 102 of FIG. 1. For example, vehicle event recorder 300 comprises one or more devices mounted in a vehicle (e.g., one or more devices communicating via a wired or wireless communication link). In the example shown, vehicle event recorder 300 comprises interface 302. For example, interface 302 comprises an interface for receiving a data system software and/or model, receiving sensor data, receiving a request for dynamic event data, receiving network communications, providing sensor data configuration information, providing an indication of an anomalous event, receiving a job for a vehicle event recorder, providing sensor data, providing communications, providing coaching information, etc. Processor 304 comprises a processor for executing applications 306. Applications 306 comprise dynamic event capture application 308, configuration setting application 310, and other applications 312. Dynamic event capture application 308 comprises an application for dynamic capturing of dynamic event data. For example, configuration setting application 310 comprises an application for extracting a location and a configuration setting from a request, modify a setting associated with collection of the dynamic event data according to the configuration setting, wherein the dynamic event data is collected using one or more sensors, determine whether the vehicle event recorder is located appropriately to record the dynamic event data using the one or more sensors, in response to determining that the vehicle event recorder is located appropriately to record the dynamic event data using the one or more sensors, record the dynamic event data, and provide the dynamic event data. Configuration setting application 310 comprises an application for setting a sensor data configuration. For example, configuration setting application 310 comprises an application for receiving a configuration setting received by vehicle event recorder 300 as part of a request for dynamic event data, determining a sensor configuration change message to effect the configuration setting change, and providing the sensor configuration change message to the sensor (e.g., via interface 302). Other applications 312 comprise any other appropriate applications (e.g., a communications application, a data storage and retrieval application, a web browser application, a user interface application, a data analysis application, etc.). Storage 314 comprises configuration data 316 (e.g., configuration settings received as part of a request for dynamic event data) and sensor data 318 (e.g., sensor data received from one or more sensors, etc.). Memory 320 comprises executing application data 322 comprising data associated with applications 306.

Figure 4:
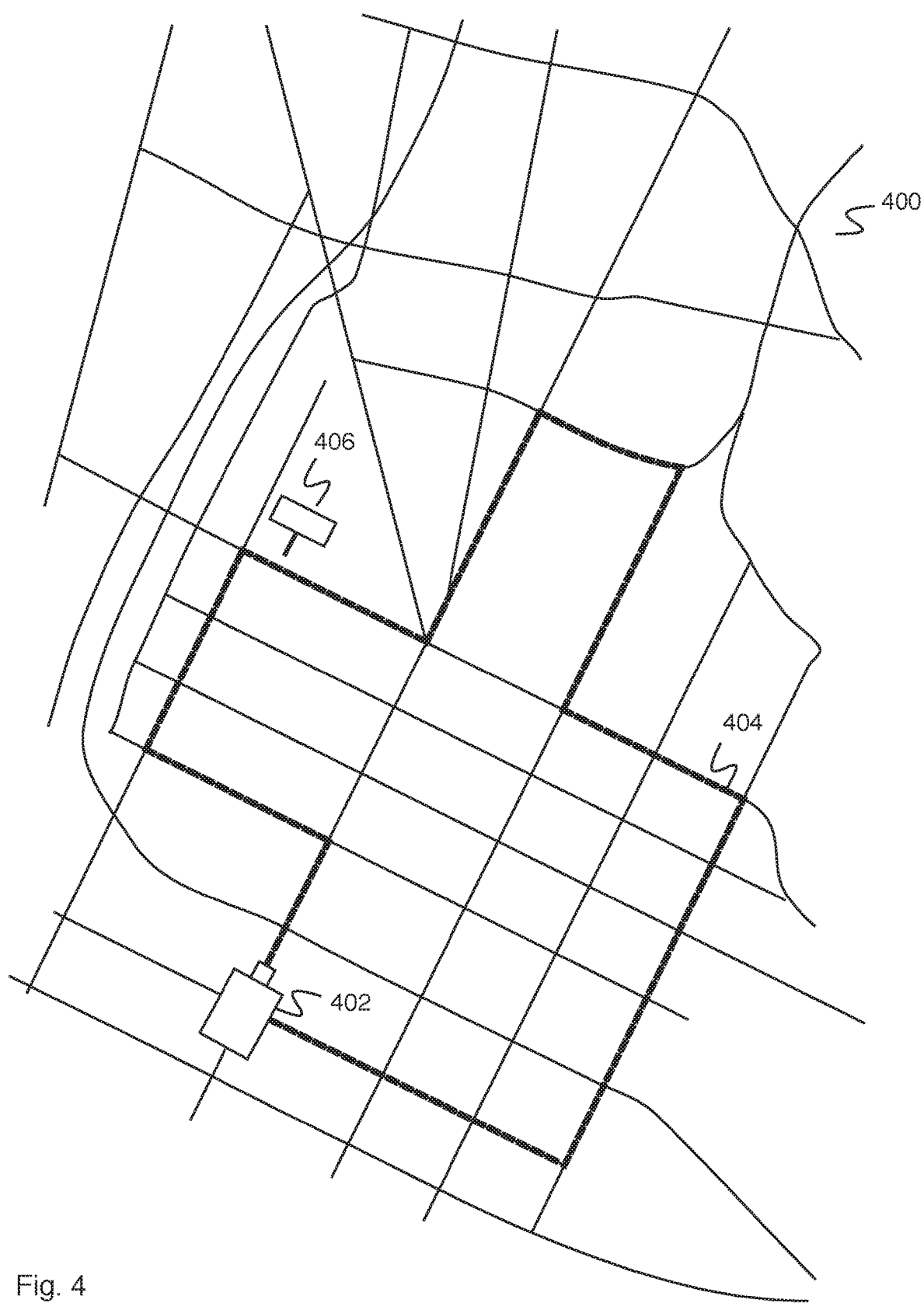
FIG. 4 is a diagram illustrating an embodiment of a map.

FIG. 4 is a diagram illustrating an embodiment of a map. In the example shown, map 400 comprises an area map including vehicle 402 following route 404. Vehicle 402 includes a vehicle event recorder (e.g., vehicle event recorder 102 of FIG. 1). A request to capture an image of billboard 406 has been received by a vehicle data center (e.g., vehicle data center 108 of FIG. 1). The vehicle data center determines that the vehicle event recorder mounted on vehicle 402 will be able to capture the image of billboard 406 in the course of its usual route, creates a location-based data identification job comprising instructions for capturing the image of billboard 406, and provides the location-based data identification job to vehicle 402. Vehicle 402 conducts its normal route. When the vehicle event recorder mounted on vehicle 402 determines it is able to capture the image of billboard 406 (e.g., when the vehicle is within a threshold distance of billboard 406 and oriented toward billboard 406), the job is executed and the image captured. Image data is provided to the vehicle data center for processing. In some embodiments, a time frame is considered for the job—for example, the job executes data capture only once or twice per week, month, year, or any other appropriate time rate.

Figure 5:
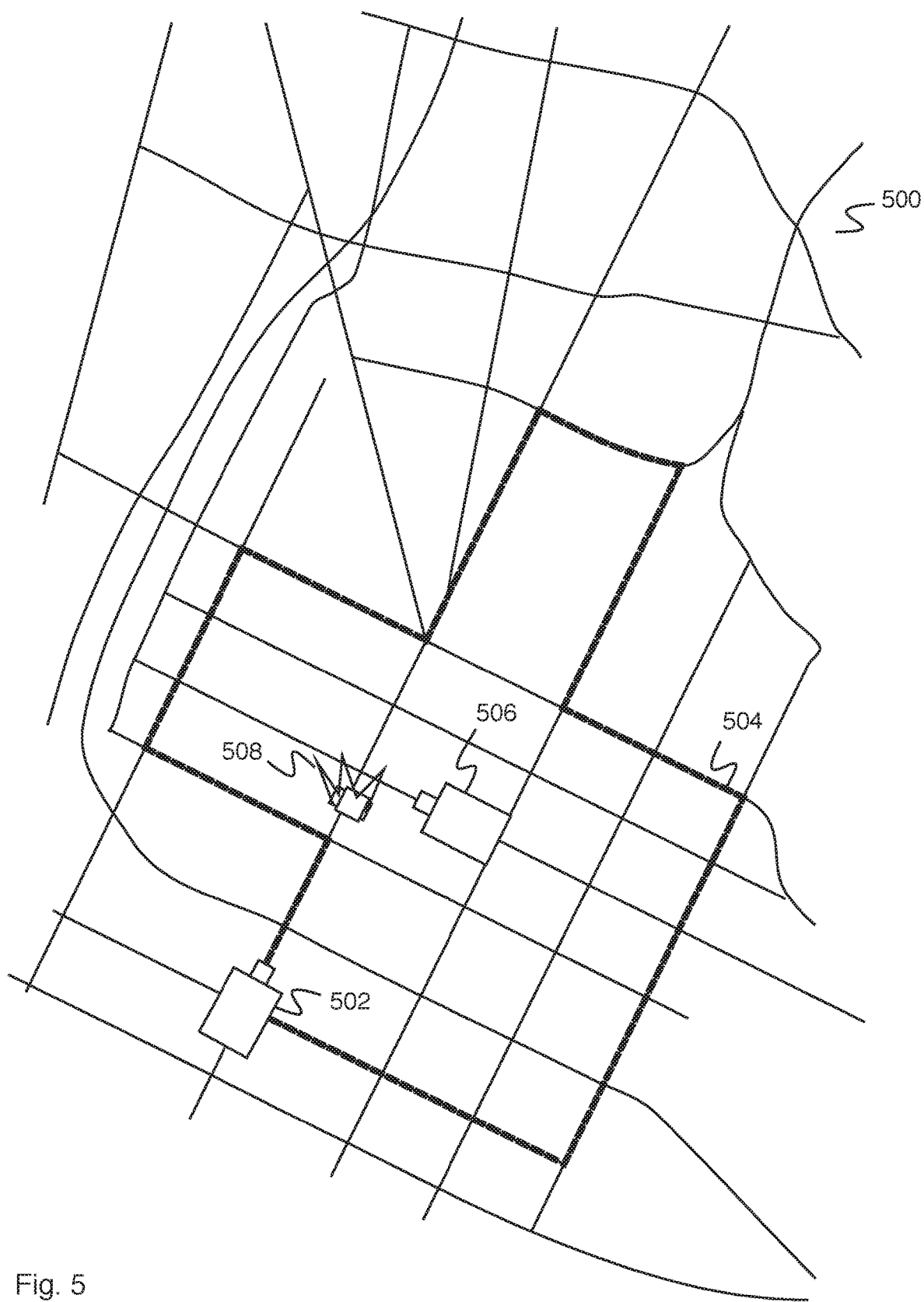
FIG. 5 is a diagram illustrating an embodiment of a map.

FIG. 5 is a diagram illustrating an embodiment of a map. In the example shown, map 500 comprises an area map including vehicle 502 and vehicle 506, each vehicle including a vehicle event recorder (e.g., vehicle event recorder 102 of FIG. 1) in communication with a vehicle data center (e.g., vehicle data center 108 of FIG. 1). Vehicle 502 follows route 504. In the example shown, the vehicle event recorder mounted on vehicle 506 captures an image of incident 508. For example, incident 508 comprises a car fire. The vehicle event recorder mounted on vehicle 506 provides the image data and location data to the vehicle data center. The vehicle data center determines that vehicle 502 will be able to capture more data of incident 508 and provides a request for dynamic event data to the vehicle event recorder mounted on vehicle 502. The request for dynamic event data comprises the location of incident 508 and a configuration setting indicating—for example, to increase a video camera capture resolution as vehicle 502 is nearby incident 508. Vehicle 502 conducts its normal route. When the vehicle event recorder mounted on vehicle 502 determines it is able to capture the image of incident 508 (e.g., when the vehicle is within a threshold distance of incident 508 and oriented toward incident 508), the image is captured. Image data is provided to the vehicle data center for processing. In some embodiments, additional vehicles (not shown) are tasked with jobs capturing more data associated with incident 508.

Figure 6:
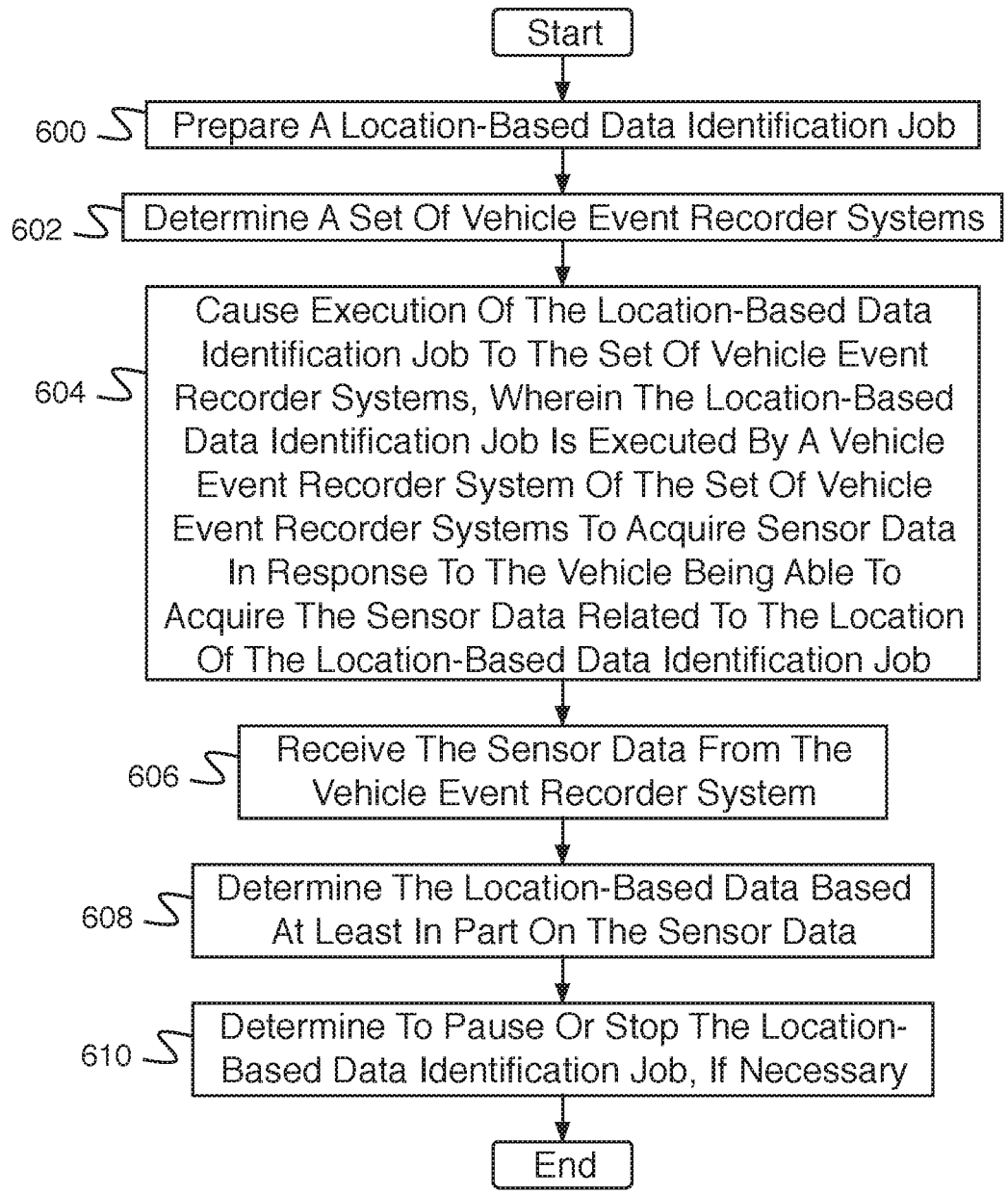
FIG. 6 is a flow diagram illustrating an embodiment of a process for capturing location-based data.

FIG. 6 is a flow diagram illustrating an embodiment of a process for capturing location-based data. In some embodiments, the process of FIG. 6 is implemented by vehicle data center 108 of FIG. 1. In the example shown, in 600, a location-based data identification job is prepared. For example, preparing a location-based data identification job comprises receiving a location-based data description, determining a location, determining a target, creating a location-based data identification job, etc. In 602, a set of vehicle event recorder systems is determined (e.g., a set of vehicle event recorder systems for executing the location-based data identification job). For example, the set of vehicle event recorder systems is determined based at least in part on vehicle routes, vehicle speeds, vehicle event recorder hardware, vehicle event recorder jobs, tenant or client permissions, location permissions, business rules, legal location permissions, federal laws, state laws, or local laws. In 604, execution of the location-based data identification job is caused to the set of vehicle event recorder systems, wherein the location-based data identification job is executed by a vehicle event recorder system of the set of vehicle event recorder systems to acquire data in response to the vehicle being able to acquire the sensor data related to the location of the location-based data identification job. In some embodiments, causing execution of the location-based data identification job to the set of vehicle event recorder systems comprises causing sending of the sensor data from the vehicle event recorder system. In 606, the sensor data is received from the vehicle event recorder system. In 608, the location-based data is determined based at least in part on the sensor data. For example, it is determined whether the data satisfies all or part of the job criteria or none of the job criteria. In 610, it is determined to pause or stop the location-based data identification job, if necessary. For example, in response to the data satisfying all or part of the criteria, it is determined whether the job should be halted or paused in some or all of the set of vehicle event recorders. In various embodiments, the job is paused or halted based on whether the vehicle event recorders are or continue to or will be in an appropriate location at an appropriate time to satisfy the job.

Figure 7:
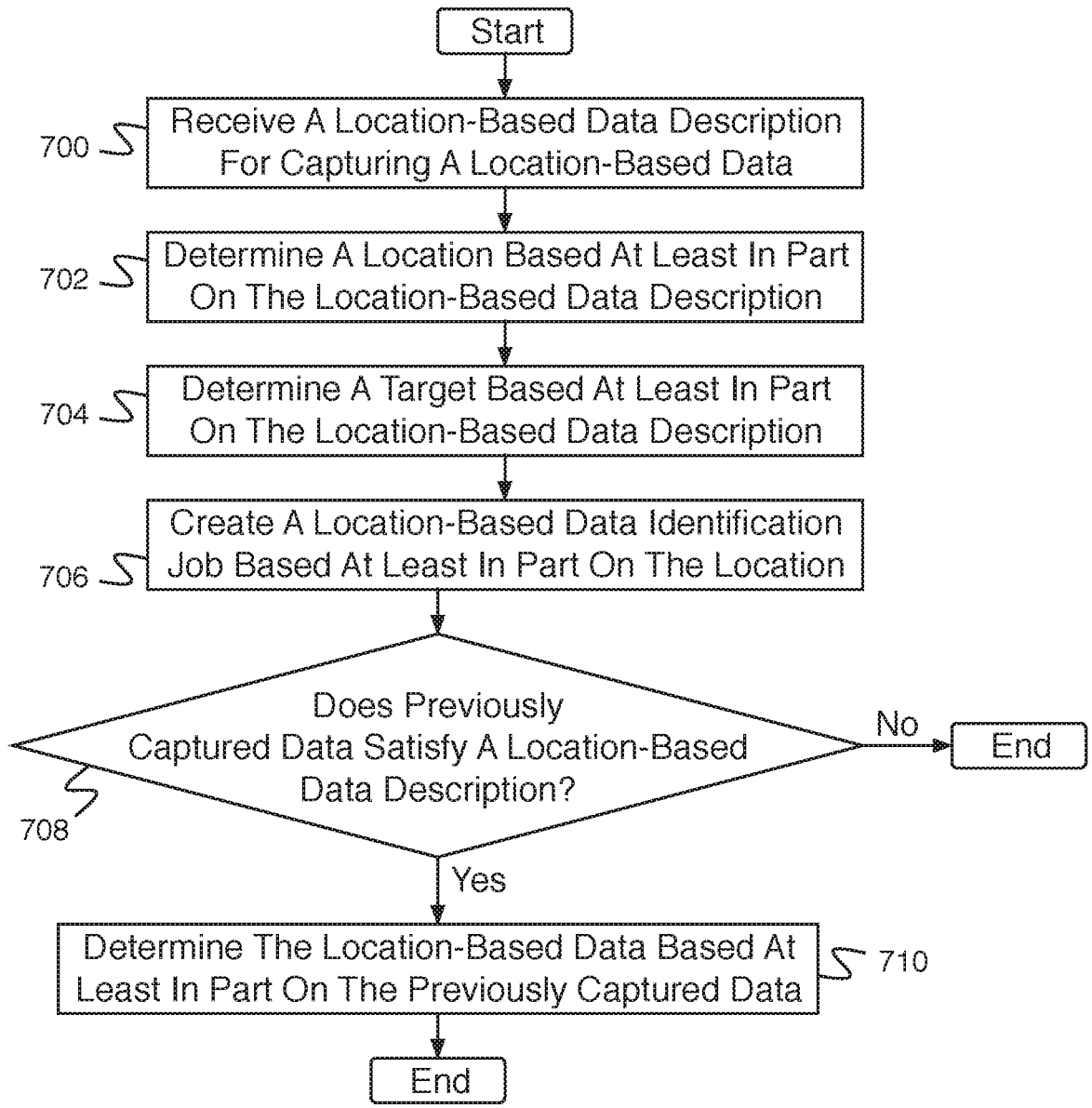
FIG. 7 is a flow diagram illustrating an embodiment of a process for preparing a location-based data identification job.

FIG. 7 is a flow diagram illustrating an embodiment of a process for preparing a location-based data identification job. In some embodiments, the process of FIG. 7 implements 600 of FIG. 6. In the example shown, in 700, a location-based data description for capturing a location-based data is received. For example, the location-based data description comprises one or more locations, one or more viewing directions (e.g., directions along which the location-based data are to be viewed), one or more object types, one or more capture frequencies (e.g., frequencies indicating how often object data is to be collected), one or more data collection time windows (e.g., a time of data for data collection, a deadline by which data must be collected, etc.), one or more geofence regions (e.g., regions within which it is determined whether target data is able to be acquired), etc. In 702, a location is determined based at least in part on the location-based data description. In some embodiments, a plurality of locations are determined. For example, the location is extracted from the location-based data description. In 704, a target is determined based at least in part on the location-based data description. For example, the target comprises a road sign, a billboard, a building, a road feature, or a construction zone. In 706, a location-based data identification job is created based at least in part on the location. The location-based job comprises location-based data collection instructions for collecting location-based data. In some embodiments, the location-based job is based at least in part on the target. In some embodiments, creating the location-based job comprises determining a geofence region including the location. For example, the geofence region comprises a geographical perimeter or a road segment. In some embodiments, a vehicle event recorder is configured to determine whether the vehicle (e.g., the vehicle it is mounted on) is able to acquire sensor data related to the location of the location-based data identification job while the vehicle is within the geofence region. In some embodiments, the processor is further configured to determine a model-based system comprising a portion of the location-based data identification job. For example, a model-based system comprises a machine learning system, a neural network system, an artificial intelligence system, a machine vision system, etc. Determining a model based system comprises determining a set of parameters describing a model of a model-based system (e.g. a set of neural network weights or a set of machine learning feature weights). In some embodiments, the location-based data identification job additionally comprises a recognition frequency (e.g., a number of times the data needs to be captured per period of time—for example, once or twice a day, a week, a month, a year, etc.).

In 708, it is determined whether previously captured data satisfies a location-based data description. For example, previously captured data comprises previously captured data stored by the vehicle data center. In the event it is determined that previously captured data does not satisfy the location-based data description, the process ends. In the event it is determined that previously captured data satisfies the location-based data description, control passes to 710. In 710, the location-based data is determined based at least in part on the previously captured data.

Figure 8:
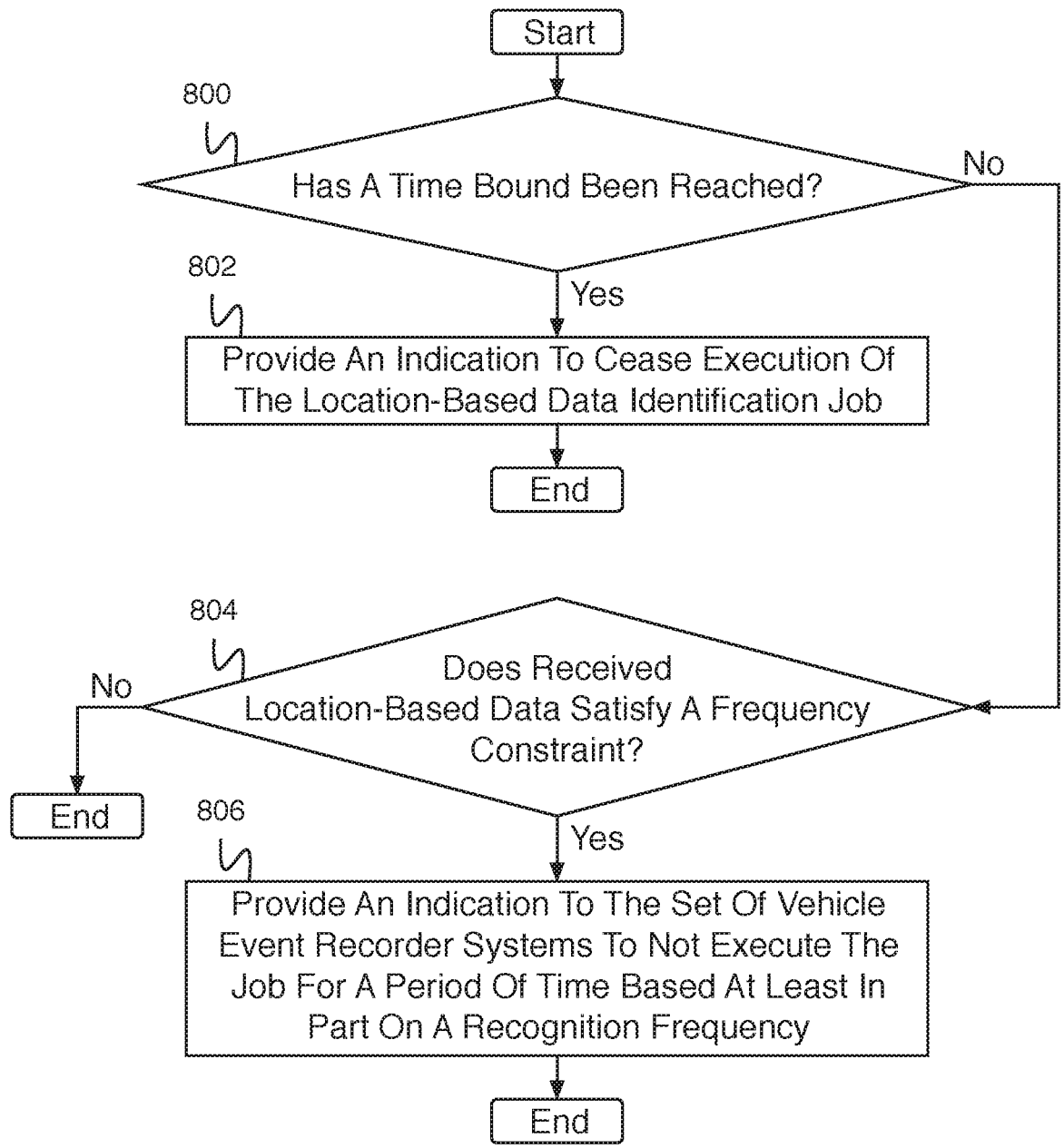
FIG. 8 is a flow diagram illustrating an embodiment of a process for pausing or stopping a location-based data identification job, if necessary.

FIG. 8 is a flow diagram illustrating an embodiment of a process for pausing or stopping a location-based data identification job, if necessary. In some embodiments, the process of FIG. 8 implements 610 of FIG. 6. In the example shown, in 800, it is determined whether a time bound has been reached. A time bound comprises a time after which the location-based data identification job should no longer be executed. For example, a time bound comprises a time bound received as part of a location-based data description. In the event it is determined in 800 that a time bound has been reached, control passes to 802. In 802, an indication is provided to cease execution of the location-based data identification job. For example, the indication is provided to a set of vehicle event recorder systems. In the event it is determined in 800 that a time bound has not been reached, control passes to 804. In 804, it is determined whether received location-based data satisfies a frequency constraint. For example, determining that the location-based data satisfies a frequency constraint comprises determining that the location-based data has been located and does not need to be located again for a predetermined period of time (e.g., receiving location-based data at least a threshold number of times within a predetermined period of time). In the event it is determined that received location-based data does not satisfy a frequency constraint, the process ends. In the event it is determined that received location-based data satisfies a frequency constraint, control passes to 806. In 806, an indication is provided to the set of vehicle event recorder systems to not execute the job for a period of time based at least in part on a recognition frequency.

Figure 9:
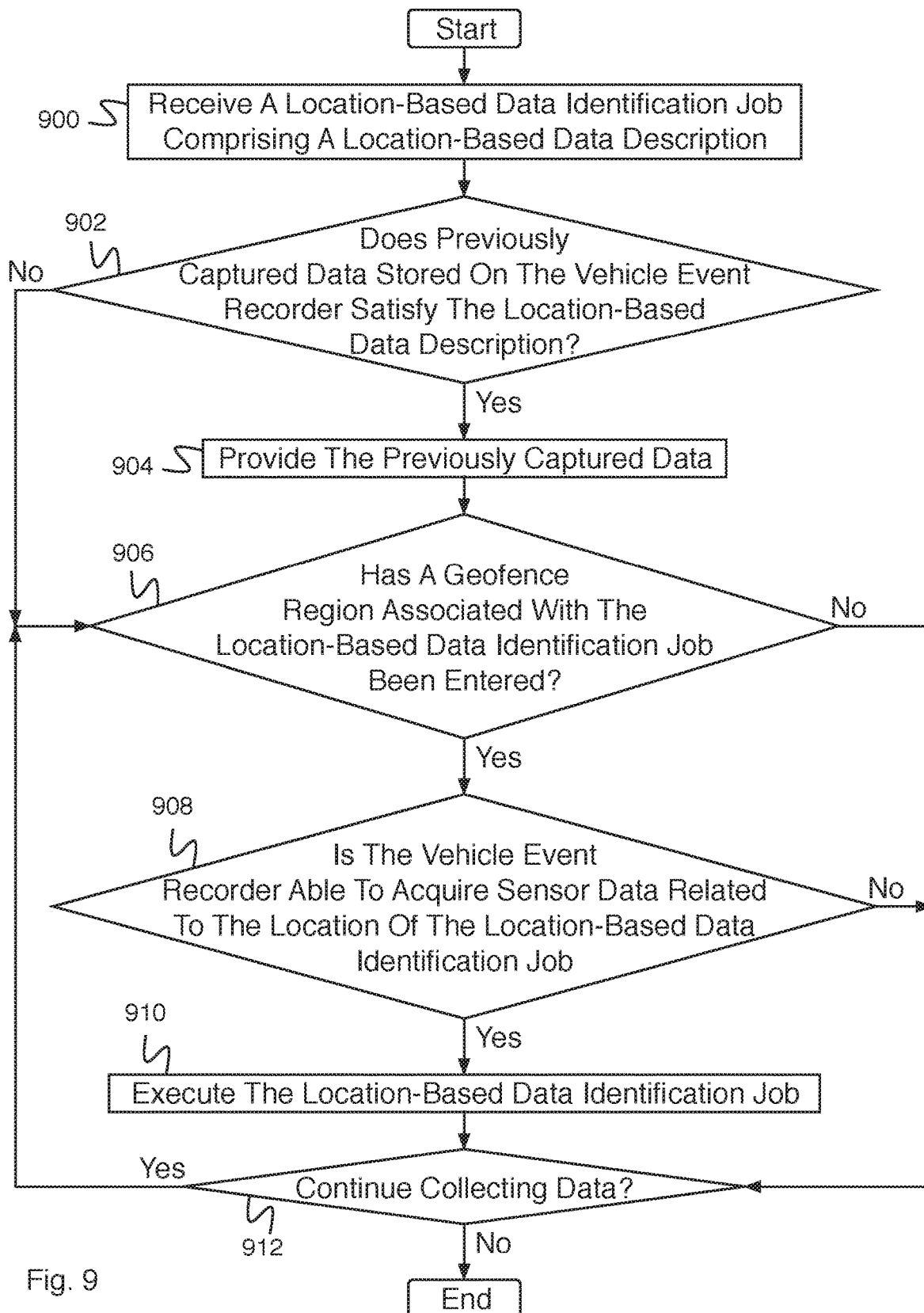
FIG. 9 is a flow diagram illustrating an embodiment of a process for a capturing location-based data on a vehicle event recorder.

FIG. 9 is a flow diagram illustrating an embodiment of a process for a capturing location-based data on a vehicle event recorder. In some embodiments, the process of FIG. 9 is executed by vehicle event recorder 102 of FIG. 1. In the example shown, in 900, a location-based data identification job comprising a location-based data description is received. For example, the location-based data identification job is received from a vehicle data center (e.g., vehicle data center 108 of FIG. 1). In 902, it is determined whether previously captured data stored on the vehicle event recorder satisfies the location-based data description. In the event it is determined that previously captured data stored on the vehicle event recorder does not satisfy the location-based data description, control passes to 906. In the event it is determined that previously captured data stored on the vehicle event recorder satisfies the location-based data description, control passes to 904. In 904, the previously captured data is provided. In 906, it is determined whether a geofence region associated with the location-based data identification job has been entered. In the event it is determined that the geofence region associated with the location-based data identification job has not been entered, control passes to 912. In the event it is determined that the geofence region associated with the location-based data identification job has been entered, control passes to 908. In 908, it is determined whether the vehicle event recorder is able to acquire sensor data related to the location of the location-based data identification job. In the event it is determined that the vehicle event recorder is not able to acquire sensor data related to the location of the location-based data identification job, control passes to 912. In the event it is determined that the vehicle event recorder is able to acquire sensor data related to the location of the location-based data identification job, control passes to 910. In 910, the location-based data identification job is executed. In 912, it is determined whether to continue collecting data. In the event it is determined to continue collecting data, control passes to 906. In the event it is determined not to continue collecting data, the process ends.

Figure 10:
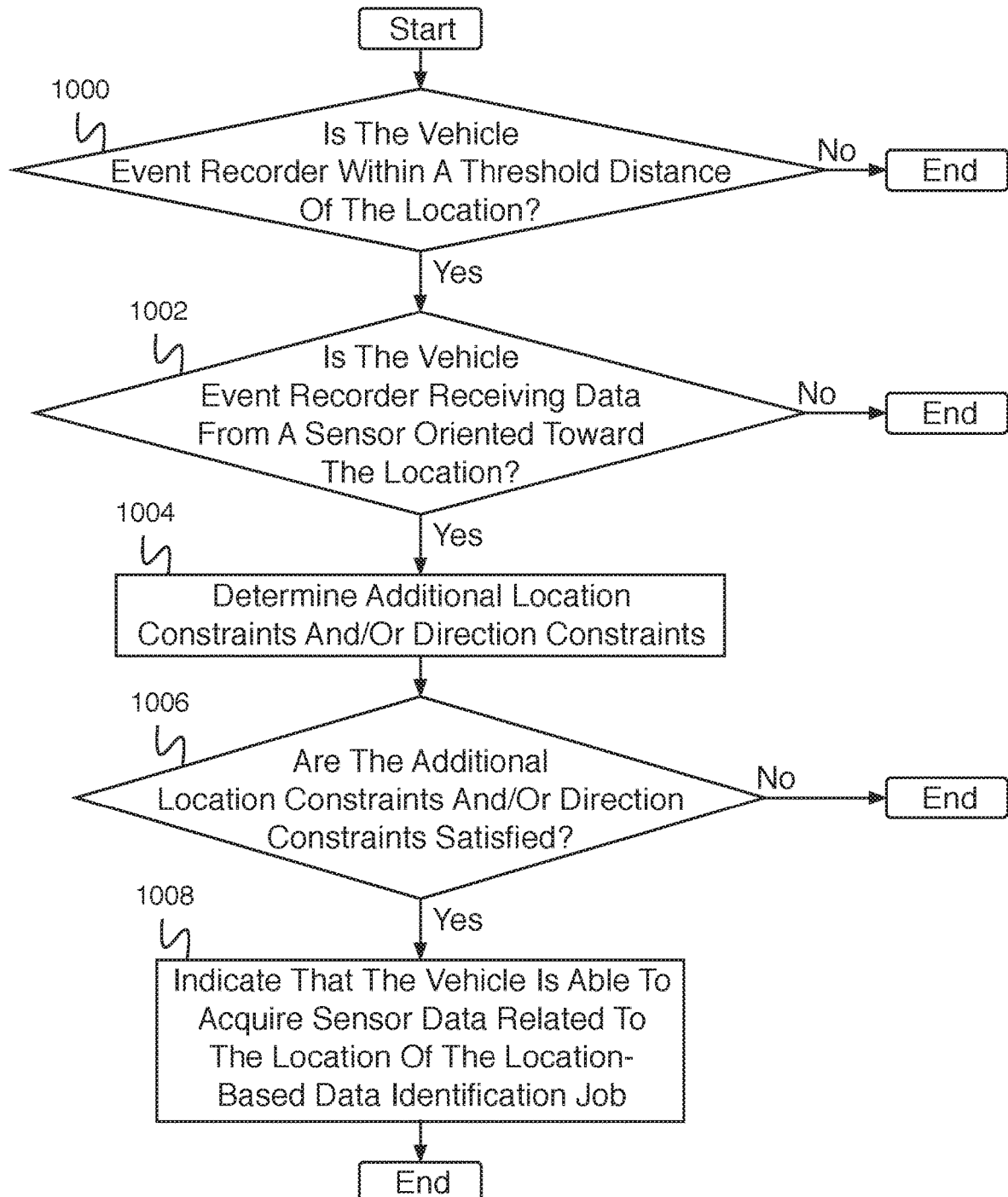
FIG. 10 is a flow diagram illustrating an embodiment of a process for determining whether a vehicle event recorder is able to acquire sensor data related to the location of a location-based data identification job.

FIG. 10 is a flow diagram illustrating an embodiment of a process for determining whether a vehicle event recorder is able to acquire sensor data related to the location of a location-based data identification job. In some embodiments, the process of FIG. 10 implements 908 of FIG. 9. In the example shown, in 1000, it is determined whether the vehicle event recorder is within a threshold distance of the location. For example, it is determined whether the vehicle event recorder is within a threshold distance of the location based at least in part on a GPS measurement. In the event it is determined that the vehicle event recorder is not within a threshold distance of the location, the process ends. In the event it is determined that the vehicle event recorder is within a threshold distance of the location, control passes to 1002. In 1002, it is determined whether the vehicle event recorder is receiving data from a sensor oriented toward the location. For example, it is determined whether the vehicle event recorder is receiving data from a sensor oriented toward the location based at least in part on sensor orientation information (e.g., a relative orientation associated with a set of sensors mounted on the vehicle, a direction of motion data, etc.) and a set of GPS measurements or a GPS measurement and a compass measurement. In the event it is determined that the vehicle event recorder is not receiving data from a sensor oriented toward the location, the process ends. In the event it is determined that the vehicle event recorder is receiving data from a sensor oriented toward the location, control passes to 1004. In 1004, additional location constraints and/or direction constraints are determined. For example, additional location constraints and/or direction constraints comprise a tighter distance threshold, a constraint depending on both distance and orientation, a constraint dependent on number of other vehicles present, a constraint dependent on time of day, a constraint dependent on vehicle travel speed, etc. In some embodiments, additional location constraints comprise model-based constraints (e.g., does a model-based processing of a sensor input indicate that the vehicle event recorder is able to acquire sensor data related to the location of a location-based data identification job). In some embodiments, no additional location and/or direction constraints are determined. In 1006, it is determined whether the additional location constraints and/or direction constraints are satisfied. In the event it is determined that the additional location constraints and/or direction constraints are not satisfied, the process ends. In the event it is determined that the additional location constraints and/or direction constraints are satisfied, control passes to 1008. In some embodiments, there are no additional location constraints and/or direction constraints allowed by the system, and step 1006 is omitted with the process of FIG. 10 flowing from 1004 directly to 1008. In 1008, the process indicates that the vehicle is able to acquire sensor data related to the location of the location-based data identification job.

Figure 11:
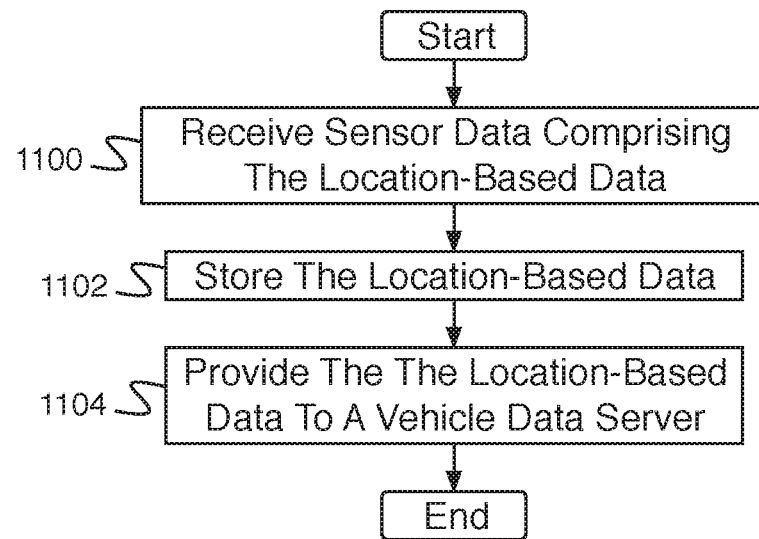
FIG. 11 is a flow diagram illustrating an embodiment of a process for executing a location-based data identification job.

FIG. 11 is a flow diagram illustrating an embodiment of a process for executing a location-based data identification job. In some embodiments, the process of FIG. 11 implements 910 of FIG. 9. In the example shown, sensor data comprising the location-based data is received. For example, data is received from one or more sensors. In 1102, the location-based data is stored. For example, the data is stored in a memory local to the vehicle event recorder. In 1104, the location-based data is provided to a vehicle data server. For example, the data is copied from the stored location in memory local to the vehicle event recorder and transmitted to the vehicle data server (e.g., transmitted via a cellular data network or a WiFi connection, etc.).

Figure 12:
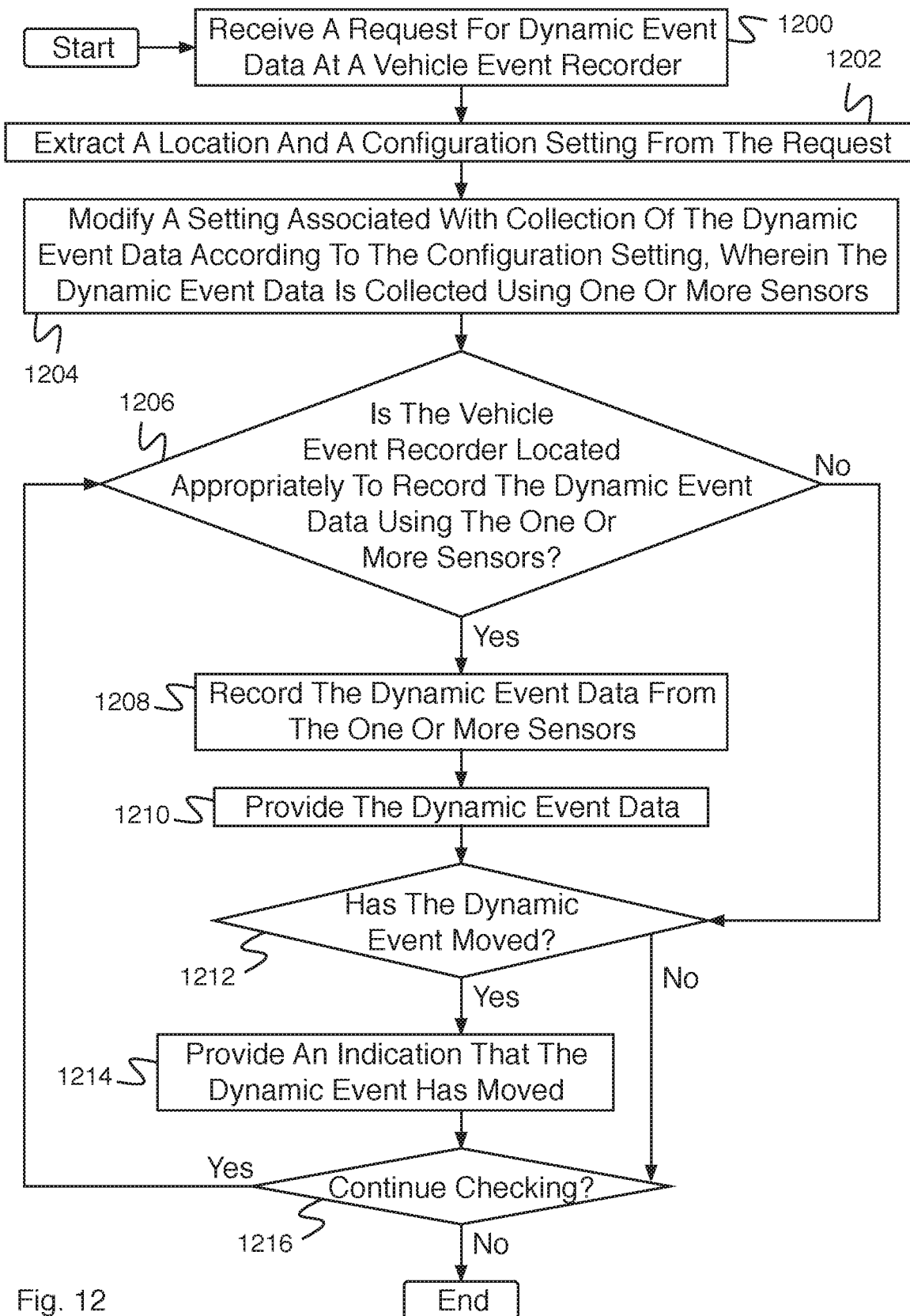
FIG. 12 is a flow diagram illustrating an embodiment of a process for dynamic capturing of dynamic event data.

FIG. 12 is a flow diagram illustrating an embodiment of a process for dynamic capturing of dynamic event data. In some embodiments, the process of FIG. 12 is executed by a vehicle event recorder (e.g., vehicle event recorder 102 of FIG. 1). In the example shown, in 1200, a request for dynamic event data is received at a vehicle event recorder. In some embodiments, the request for dynamic event data is received from a server system (e.g., a vehicle data center). For example, dynamic event data comprises data describing a limited duration event (e.g., an event in progress, a moving event, an event that may stop or change without warning, etc.). In some embodiments, the vehicle event recorder comprises a vehicle event recorder selected by a server system to receive the request for dynamic event data. In some embodiments, the request for dynamic event data is received at the vehicle event recorder while the vehicle is in service (e.g., while the vehicle is traveling on its route, via a wireless connection, while not at a home station, etc.). In some embodiments, the request for dynamic event data comprises a time window (e.g., a time window indicating a time range during which the request for dynamic event data is in effect). For example, the time window typically begins soon after receiving the request for dynamic event data (e.g., immediately, less than a second, less than a minute, less than an hour, or less than a day). In 1202, a location and a configuration setting are extracted from the request. For example, the location and the configuration are received as part of the request or in separate (e.g., one or more than one) communications to the vehicle event recorder. In 1204, a setting associated with collection of the dynamic event data is modified according to the configuration setting, wherein the dynamic event data is collected using one or more sensors. For example, the configuration setting comprises a video sample rate, a video resolution, a sensor sample rate, a sensor resolution, or a set of sensors for data collection, or any other appropriate configuration setting. In some embodiments, the setting is modified only while the vehicle is determined to be within a geofence region (e.g., a geofence region associated with the request for dynamic event data). For example, the setting is modified when the vehicle event recorder is close to the location where the desired dynamic event data is located and/or oriented toward the location of or able to take the dynamic event data location. In 1206, it is determined whether the vehicle event recorder is located appropriately to record the dynamic event data using the one or more sensors. In the event it is determined that the vehicle event recorder is not located appropriately to record the dynamic event data using the one or more sensors, control passes to 1212. In the event it is determined that the vehicle event recorder is located appropriately to record the dynamic event data using the one or more sensors, control passes to 1208. In 1208, the dynamic event data is recorded from the one or more sensors. In 1210, the dynamic event data is provided (e.g., to the server system). In 1212, it is determined whether the dynamic event has moved. For example, it is determined whether the dynamic event has moved based at least in part on observing the dynamic event in motion, on observing the dynamic event not present in the location indicated, on receiving an indication that the dynamic event has moved, etc. For example, a deer or road sweeping crew is moving close to on the road. In the event it is determined that the dynamic event has not moved, control passes to 1216. In the event it is determined that the dynamic event has moved, control passes to 1214. In 1214, an indication is provided that the dynamic event has moved (e.g., to the server system). In 1216, it is determined whether to continue checking (e.g., checking whether the vehicle event recorder is located appropriate to record the dynamic event data using the one or more sensors). In some embodiments, a determination whether or not to continue checking is based at least in part on a time window (e.g., a time window associated with the request for dynamic event data). In the event it is determined to continue checking, control passes to 1206. In the event it is determined not to continue checking, the process ends.

Figure 13:
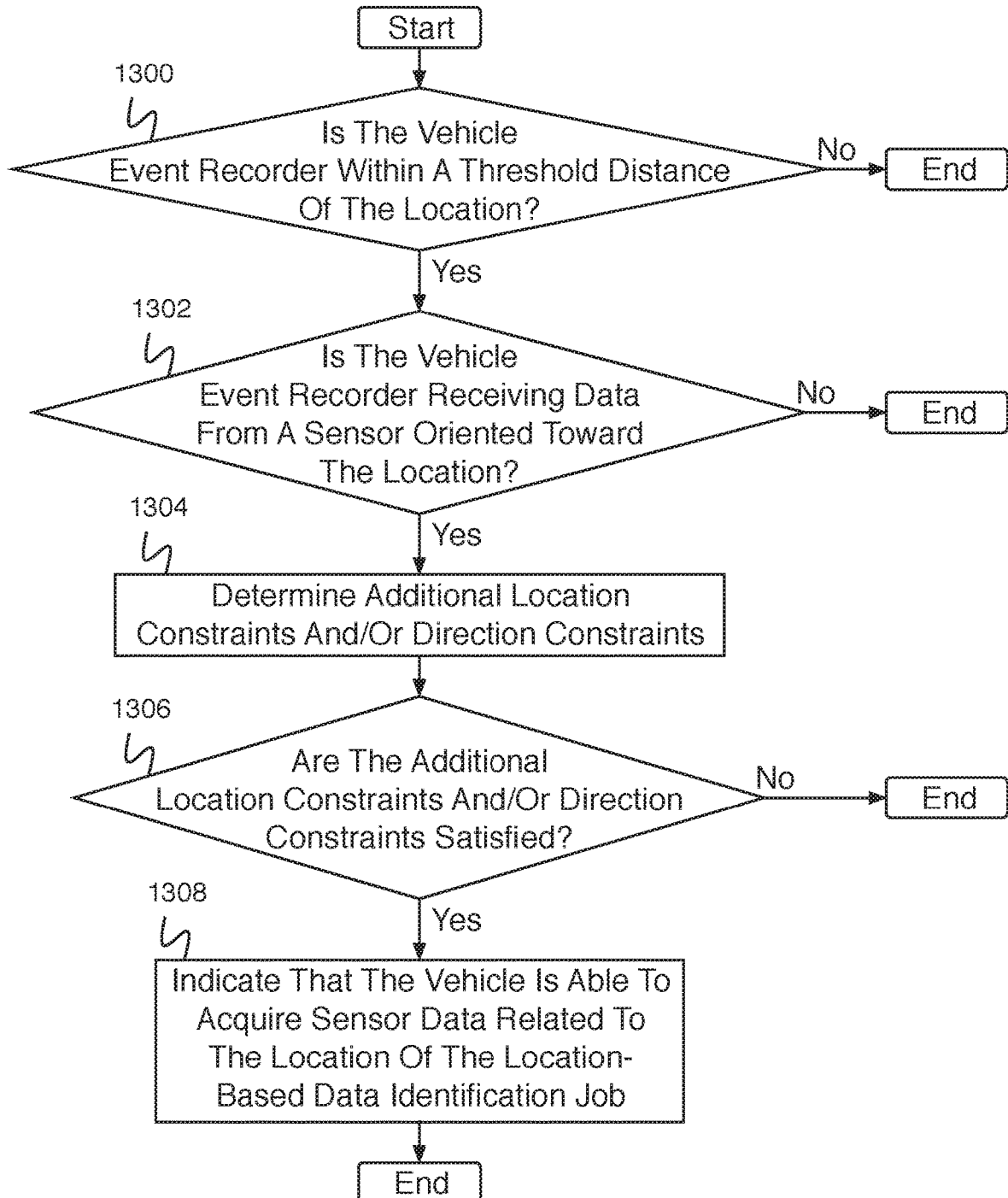
FIG. 13 is a flow diagram illustrating an embodiment of a process for determining whether a vehicle event recorder is located appropriately to record the dynamic event data using one or more sensors.

FIG. 13 is a flow diagram illustrating an embodiment of a process for determining whether a vehicle event recorder is located appropriately to record the dynamic event data using one or more sensors. In some embodiments, the process of FIG. 13 implements 1206 of FIG. 12. In the example shown, in 1300, it is determined whether the vehicle event recorder is within a threshold distance of the location. For example, it is determined whether the vehicle event recorder is within a threshold distance of the location associated with the request based at least in part on a GPS measurement. In the event it is determined that the vehicle event recorder is not within a threshold distance of the location, the process ends. In the event it is determined that the vehicle event recorder is within a threshold distance of the location, control passes to 1302. In 1302, it is determined whether the vehicle event recorder is receiving data from a sensor oriented toward the location. For example, it is determined whether the vehicle event recorder is receiving data from a sensor oriented toward the location of the request based at least in part on sensor orientation information (e.g., a relative orientation associated with a set of sensors mounted on the vehicle) and a set of GPS measurements or a GPS measurement and a compass measurement. In the event it is determined that the vehicle event recorder is not receiving data from a sensor oriented toward the location, the process ends. In the event it is determined that the vehicle event recorder is receiving data from a sensor oriented toward the location, control passes to 1304. In 1304, additional location constraints and/or direction constraints are determined. For example, additional location constraints and/or direction constraints comprise a tighter distance threshold, a constraint depending on both distance and orientation, a constraint dependent on number of other vehicles present, a constraint dependent on time of day, a constraint dependent on vehicle travel speed, a constraint based on buildings or other obstructions that restrict sensor abilities to detect an event, etc. In some embodiments, additional location constraints comprise model-based constraints (e.g., does a model-based processing of a sensor input indicate that the vehicle event recorder is able to acquire sensor data related to the location of a location-based data identification job). In some embodiments, no additional location and/or direction constraints are determined. In 1306, it is determined whether the additional location constraints and/or direction constraints are satisfied. For example, the vehicle event recorder is within a tighter distance threshold, within a distance and oriented appropriately (e.g., facing the location of the event), is in the presence of a threshold number of vehicles, is at time, after a time, before a time, or within a threshold time window, is within a vehicle speed range, above a speed threshold, below a speed threshold, located oriented to avoid local obstructions, etc. In the event it is determined that the additional location constraints and/or direction constraints are not satisfied, the process ends. In the event it is determined that the additional location constraints and/or direction constraints are satisfied, control passes to 1308. In 1308, the process indicates that the vehicle is able to acquire sensor data related to the location of the location-based data identification job.

Figure 14:
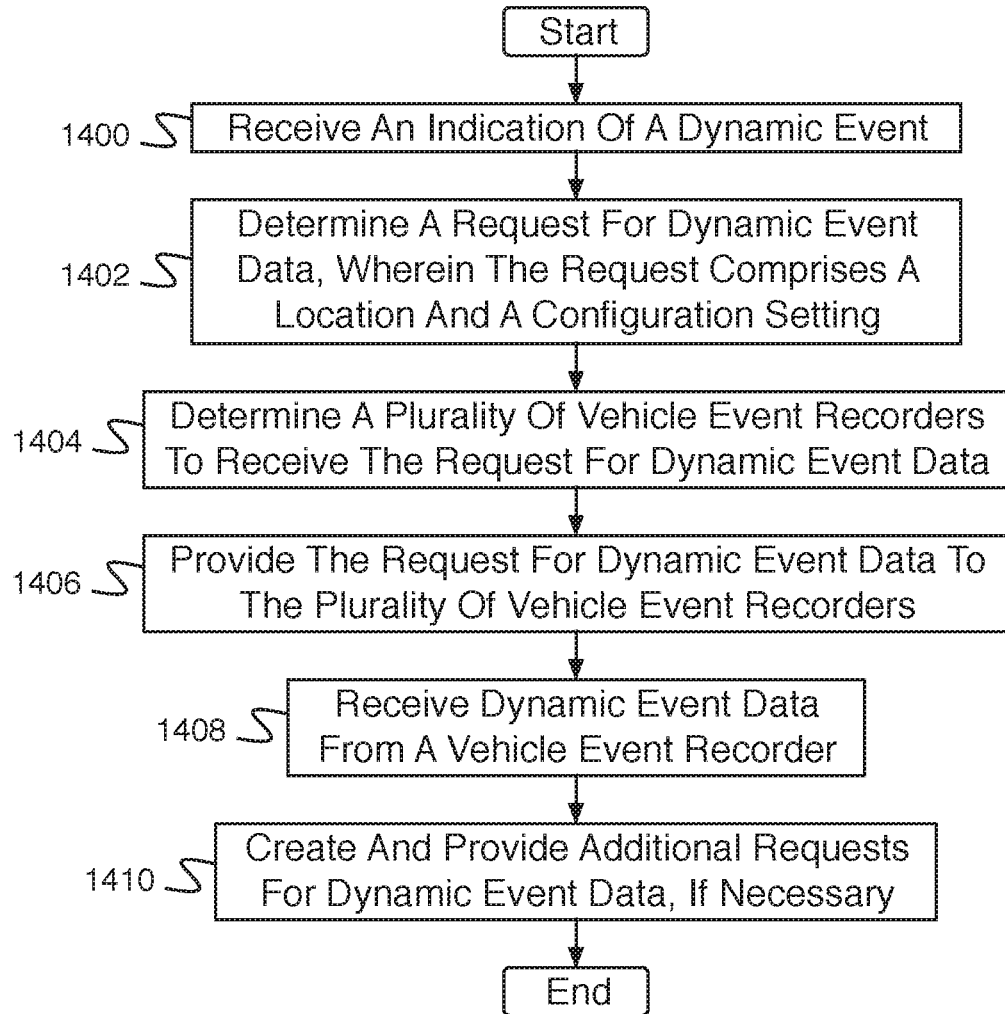
FIG. 14 is a flow diagram illustrating an embodiment of a process for a initiating a dynamic request to capture dynamic event data.

FIG. 14 is a flow diagram illustrating an embodiment of a process for a initiating a dynamic request to capture dynamic event data. In some embodiments, the process of FIG. 14 is executed by vehicle data center 108 of FIG. 1. In the example shown, in 1400, an indication of a dynamic event is received. In some embodiments, the indication of the dynamic event is received from a vehicle event recorder. In 1402, a request for dynamic event data is determined, wherein the request comprises a location and a configuration setting. For example, the location comprises the location of the dynamic event and the configuration setting comprises a configuration setting enabling better capture of dynamic event data (e.g., a high video resolution configuration setting, a high video frame rate configuration setting, a high audio sample rate, a high accelerometer power level, etc.). In 1404, a plurality of vehicle event recorders to receive the request for dynamic event data is determined. For example, the plurality of vehicle event recorders comprises a plurality of vehicle event recorders near the dynamic event location or whose planned route takes them near the dynamic event location. In various embodiments, the plurality of vehicle event recorders comprises a plurality of vehicle event recorders selected based in part on an associated vehicle route, on vehicle event recorder processor capabilities, on vehicle event recorder associated sensors, on a current location, on a known future location, or based on any other appropriate data. In 1406, the request for dynamic event data is provided to the plurality of vehicle event recorders. In 1408, dynamic event data is received from a vehicle event recorder. In 1410, additional requests for dynamic event data are created and provided, if necessary.

Figure 15:
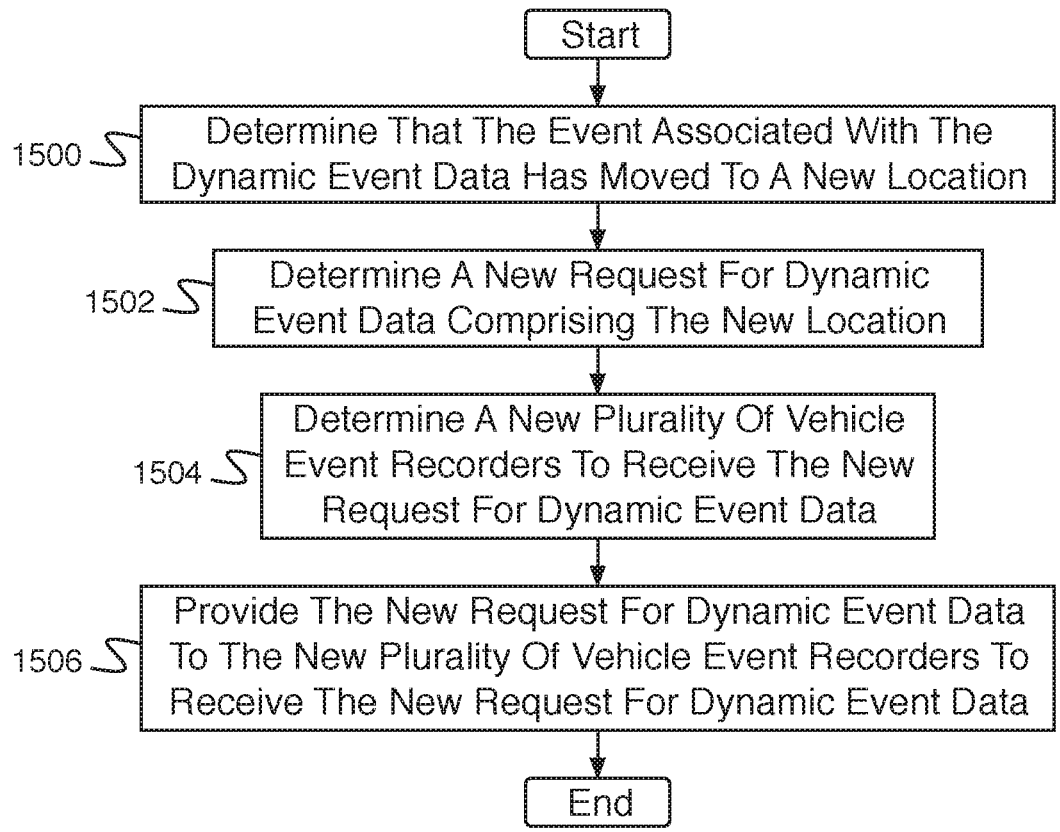
FIG. 15 is a flow diagram illustrating an embodiment of a process for creating additional requests for dynamic event data in the event that a dynamic event has changed location.

FIG. 15 is a flow diagram illustrating an embodiment of a process for creating additional requests for dynamic event data in the event that a dynamic event has changed location. In some embodiments, the process of FIG. 15 implements 1410 of FIG. 14 in the event that the dynamic event has changed location. In the example shown, in 1500, it is determined that the event associated with the dynamic event data has moved to a new location. For example, it is determined that the event associated with the dynamic event data has moved to a new location based at least in part on a new indication of a dynamic event or it is determined that the event associated with the dynamic event data has moved to a new location based at least in part on a known rate of movement for the dynamic event (e.g., as received in the request or determined using motion determination/analysis performed on received video data) or a new detected location (e.g., using GPS location of the vehicle and sensor determination). In 1502, a new request for dynamic event data comprising the location is determined. In 1504, a new plurality of vehicle event recorders to receive the new request for dynamic event data is determined. In 1506, the new request for dynamic event data is provided to the new plurality of vehicle event recorders to receive the new request for dynamic event data.

Figure 16:
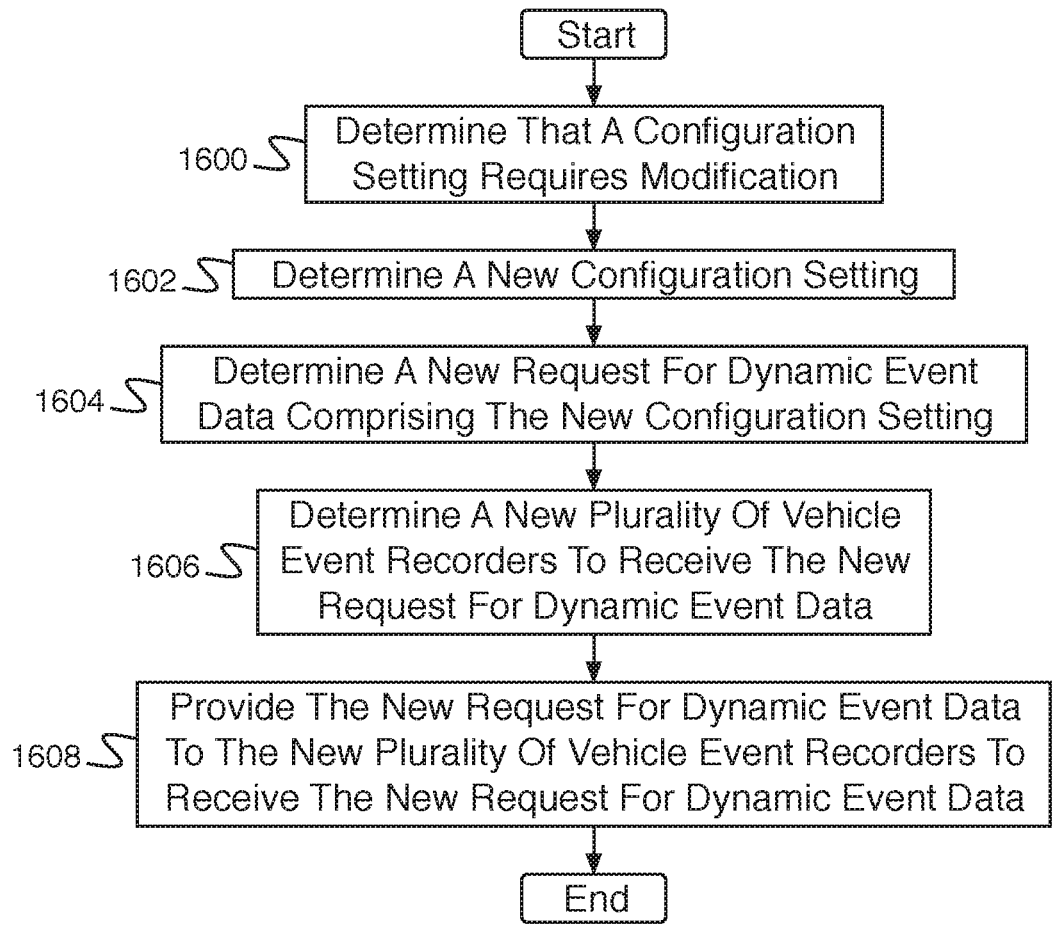
FIG. 16 is a flow diagram illustrating an embodiment of a process for creating additional requests for dynamic event data in the event that a configuration setting requires modification.

FIG. 16 is a flow diagram illustrating an embodiment of a process for creating additional requests for dynamic event data in the event that a configuration setting requires modification. In some embodiments, the process of FIG. 16 implements 1410 of FIG. 14 in the event that the configuration setting requires modification. In the example shown, in 1600, it is determined that a configuration setting requires modification. For example, it is determined that a configuration setting requires modification based at least in part on a received dynamic event data not being of high enough quality. In 1602, a new configuration setting is determined. For example, the new configuration setting is determined based at least in part on the received dynamic event data. In 1604, a new request for dynamic event data comprising the new configuration setting is determined. For example, the new request for dynamic event data is based at least in part on the dynamic event data. In various embodiments, the new configuration setting comprises a higher sensor resolution, a higher video frame rate, a higher sensor sample rate, an additional sensor for data capture, or any other appropriate configuration setting. In some embodiments, the new request for dynamic event data comprises an indication to immediately capture data at the new configuration setting. In 1606, a new plurality of vehicle event recorders to receive the new request for dynamic event data is determined. For example, a set of vehicle event recorders are determined to receive the new request for dynamic event data based on location, vehicle route, orientation, etc. In 1608, the new request for dynamic event data is provided to the new plurality of vehicle event recorders to receive the new request for dynamic event data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an interface configured to receive a request for dynamic event data for a target object at a vehicle event recorder mounted on a vehicle, wherein the vehicle event recorder was selected by a server system to receive the request based at least in part on a target location of the target object and a future location of a predetermined normal vehicle route of the vehicle; and
a processor of the vehicle event recorder configured to:
receive the request for the dynamic event data for the target object;
extract the target location and a configuration setting from the request;
modify a setting associated with collection of the dynamic event data according to the configuration setting, wherein the dynamic event data is collected using one or more sensors;
determine whether the vehicle is within a threshold distance of the target location and oriented towards the target object to record the dynamic event data using the one or more sensors, wherein the one or more sensors comprise exterior video recorders, exterior audio recorders, exterior cameras, or any combination thereof;
in response to determining that the vehicle is within the threshold distance of the target location of and oriented towards the target object to record the dynamic event data using the one or more sensors, record the dynamic event data from the one or more sensors; and
provide the dynamic event data.

2. The system of claim 1, wherein the configuration setting comprises a video sample rate, a video resolution, a sensor sample rate, a sensor resolution, or a set of sensors for data collection.

3. The system of claim 1, wherein dynamic event data comprises data describing a limited duration event.

4. The system of claim 1, wherein the vehicle event recorder comprises one of a plurality of vehicle event recorders selected to receive the request for dynamic event data.

5. The system of claim 4, wherein the plurality of vehicle event recorders comprises a plurality of vehicle event recorders selected based at least in part on an associated vehicle route, on one or more associated vehicle event recorder processor capabilities, on one or more associated vehicle event recorder sensors, on an associated current location, on an associated known future location, or any combination thereof.

6. The system of claim 1, wherein the processor is further configured to determine that the event associated with the dynamic event data has moved.

7. The system of claim 6, wherein the processor is further configured to provide an indication to a server system that the event associated with the dynamic event data has moved.

8. The system of claim 7, wherein the server is configured to determine a new request for dynamic event data and a new set of vehicle event recorder systems, and provide the new request for dynamic event data to the new set of vehicle event recorder systems.

9. The system of claim 1, wherein the request for dynamic event data is received at the vehicle event recorder while the vehicle event recorder is in service.

10. The system of claim 1, wherein the setting associated with collection of the dynamic event data is modified while the vehicle event recorder is in service.

11. The system of claim 1, wherein the request for dynamic event data is associated with a time window.

12. The system of claim 11, wherein the time window begins soon after receiving the request for dynamic event data.

13. The system of claim 12, wherein soon comprises immediately, less than a second, less than a minute, less than an hour, or less than a day.

14. The system of claim 1, wherein a server is configured to determine a new request for dynamic event data based at least in part on the dynamic event data.

15. The system of claim 14, wherein the new request for dynamic event data comprises a new configuration setting.

16. The system of claim 15, wherein the new configuration setting comprises a higher sensor resolution, a higher video frame rate, a higher sensor sample rate, or an additional sensor for data capture.

17. The system of claim 15, wherein the new request for dynamic event data comprises an indication to immediately capture data at the new configuration setting.

18. The system of claim 1, wherein the target object comprises one of a road sign, a billboard, a building, a road feature, and a construction zone.

19. A method, comprising:
receiving a request for dynamic event data for a target object at a vehicle event recorder mounted on a vehicle, wherein the vehicle event recorder was selected by a server system to receive the request based at least in part on a target location of the target object and a future location of a predetermined normal vehicle route of the vehicle;
extracting, using a processor of the vehicle event recorder, the target location and a configuration setting from the request;
modifying a setting associated with collection of the dynamic event data according to the configuration setting, wherein the dynamic event data is collected using one or more sensors;
determining whether the vehicle is within a threshold distance of the target location and oriented towards the target object to record the dynamic event data using the one or more sensors, wherein the one or more sensors comprise exterior video recorders, exterior audio recorders, exterior cameras, or any combination thereof;
in response to determining that the vehicle is within the threshold distance of the target location and oriented towards the target object to record the dynamic event data using the one or more sensors, recording the dynamic event data from the one or more sensors; and
providing the dynamic event data.

20. A computer program product, the computer program product being embodied in a non-transitory computer readable storage medium and comprising computer instructions for:
receiving a request for dynamic event data for a target object at a vehicle event recorder mounted on a vehicle, wherein the vehicle event recorder was selected by a server system to receive the request based at least in part on a target location of the target object and a future location of a predetermined normal vehicle route of the vehicle;
extracting, using a processor of the vehicle event recorder, the target location and a configuration setting from the request;
modifying a setting associated with collection of the dynamic event data according to the configuration setting, wherein the dynamic event data is collected using one or more sensors, wherein the one or more sensors comprise exterior video recorders, exterior audio recorders, exterior cameras, or any combination thereof;
determining whether the vehicle is within a threshold distance of the target location and oriented towards the target object to record the dynamic event data using the one or more sensors;
in response to determining that the vehicle is within the threshold distance of the target location and oriented towards the target object to record the dynamic event data using the one or more sensors, recording the dynamic event data from the one or more sensors; and
providing the dynamic event data.

* * * * *